(12) United States Patent
Namikata

(10) Patent No.: US 7,298,513 B2
(45) Date of Patent: Nov. 20, 2007

(54) IMAGE PROCESSING SYSTEM AND METHOD OF CONTROLLING SAME

(75) Inventor: Takeshi Namikata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 981 days.

(21) Appl. No.: 10/405,367

(22) Filed: Apr. 3, 2003

(65) Prior Publication Data

US 2003/0193688 A1    Oct. 16, 2003

(30) Foreign Application Priority Data

Apr. 11, 2002    (JP) .............................. 2002-109440

(51) Int. Cl.
*G06F 15/00*    (2006.01)
(52) U.S. Cl. .................... 358/1.15; 358/1.9; 358/1.13; 358/504; 358/518
(58) Field of Classification Search ................. 358/1.9, 358/1.13, 1.15, 504, 518; 345/89; 382/162; 101/484
See application file for complete search history.

(56) References Cited

U.S. PATENT DOCUMENTS

| 6,064,359 | A * | 5/2000 | Lin et al. ....................... 345/89 |
| 6,574,002 | B1 * | 6/2003 | Paczewitz ................... 358/1.13 |
| 6,752,082 | B2 * | 6/2004 | Derhak et al. ............... 101/484 |
| 6,888,648 | B2 * | 5/2005 | Odagiri et al. ................ 358/1.9 |
| 6,952,493 | B2 * | 10/2005 | Zeng ............................ 382/162 |
| 7,068,380 | B2 * | 6/2006 | Milton et al. ............... 358/1.13 |
| 7,075,678 | B2 * | 7/2006 | Ohkubo ....................... 358/1.9 |
| 2002/0031258 | A1 | 3/2002 | Namikata ..................... 382/165 |
| 2002/0060797 | A1 | 5/2002 | Namikata ..................... 358/1.9 |
| 2003/0133138 | A1 | 7/2003 | Namikata ..................... 358/1.9 |

FOREIGN PATENT DOCUMENTS

| JP | 8-297734 | 11/1996 |
| JP | 11-4353 | 1/1999 |
| JP | 2002-77661 | 3/2002 |
| JP | 2002-84433 | 3/2002 |

* cited by examiner

*Primary Examiner*—Twyler Lamb
*Assistant Examiner*—Vu Hang
(74) *Attorney, Agent, or Firm*—Fitzpatrick, Cella, Harper & Scinto

(57) ABSTRACT

In a system in which color matching is performed upon downloading a profile from a profile management server (100), the profile of a target printer may not be available under the management of the profile management server. In such case the profile management server decides a similar profile based upon information relating to the target printer. This information is composed of colorimetric values obtained on a print sample from the target computer and image data values of the print sample. The profile management server evaluates color differences with respect to color values of profiles under its management and selects a profile for which the color difference is smallest as the similar profile.

7 Claims, 11 Drawing Sheets

FIG. 3

| 301 | 302 | 303 | 304 | 305 |
| --- | --- | --- | --- | --- |
| PRODUCT NAME | PRINTER NAME | DEVICE CATEGORY | PROFILE NAME | PROFILE CREATION DATE |
| MFP-01 | MFP1 | COPIER | MFP1_PROFILE | 2001/9/11 8:52 |
| MFP-02 | MFP2 | COPIER | MFP2_PROFILE | 2001/12/1 9:03 |
| LBP-01 | LBP1 | LASER PRINTER | LBP1_PROFILE | 2001/7/5 11:00 |
| LBP-02 | LBP2 | LASER PRINTER | LBP2_PROFILE | 2001/10/31 17:18 |
| BJ-01 | BJ1 | INK-JET PRINTER | — | — |

IMAGE PROCESSING SYSTEM AND METHOD OF CONTROLLING SAME

FIELD OF THE INVENTION

This invention relates to an image processing system and to a method of controlling the same. More particularly, the invention relates to an image processing system, in which color reproducibility of a printer belonging to the system is controlled, and to a method of controlling this system.

BACKGROUND OF THE INVENTION

The color reproducibility of printers has improved markedly in recent years and such printers are now capable of meeting various demands. For example, these include a proof output for calibrating the output of the printer, and a print service for printing images captured by a digital camera.

In order to improve the color reproducibility of an output image in an application for satisfying the above-mentioned demands, it is extremely important to match colors between printers of different models; and accommodate individual differences between printers of the same model.

The Color Management System (CMS), which is based on an ICC profile, has been into practice as a color management arrangement for implementing the above points.

An ICC profile is mainly divided into a tag portion, which describes the correspondence between device-independent color space (Lab, XYZ, etc.) and device color space (RGB, CMYK, etc.), and a header portion that describes the attributes of the profile itself. In CMS, the profile of a target printer to undergo color matching and the profile of a printer that actually produces the output are set in a CMM (Color Matching Module) as a source profile and output profile, respectively, and color matching is then executed according to the following flow: target-device color space, device-independent color space, output-device color space.

Owing to the strong non-linearity of the device characteristic in the printer profile, generally the correspondence between device-independent color space and device color space in the tag is implemented in the form of a LUT. Lab color space often is adopted as device-independent color space. In other words, in the case of an RGB printer, the corresponding relationship between color values in the tag is retained in the form of a LUT of RGB-Lab and a LUT of Lab-RGB.

In order to create such a profile, it is required that a number of color patches for describing the characteristics of the printer be printed out by the printer and that the color patches be measured by a colorimetry device.

Thus, since it is necessary to output a number of color patches and measure the colors thereof in order to create the profile of a printer, a great deal of time is required. Naturally, the profile of a printer cannot be created unless the printer is at hand.

Further, there is also demand to perform color matching using as a reference a print sample that has been printed out by a certain specific printer. In such case a profile cannot be created in the above-described manner because a color-patch output from the printer cannot be acquired.

Thus, if the profile of a printer that is the target of an output cannot be created, suitable color matching to which CMS is applied is difficult to carry out at this printer.

SUMMARY OF THE INVENTION

Accordingly, an object of the present invention is to provide an image processing system and a method of controlling the same through which simple color matching can be applied to a printer for which it is difficult to create a unique profile.

According to an aspect of the present invention, the foregoing object is attained by providing an image processing system comprising: a plurality of printers; a profile management server for managing a plurality of profiles that express color characteristics of respective ones of the plurality of printers; a client for outputting data to the plurality of printers and for being connected to the profile management server; and a network connecting the printers, the profile management server and the client; the printers downloading profiles from the profile management server and performing color matching; wherein if a profile of a target printer that is the destination of the data output from the client is not under management, the profile management server decides a similar profile based upon information relating to the target printer.

According to another aspect of the present invention, the foregoing object is attained by providing An image processing system comprising:

a plurality of printers;

a profile management server for managing a plurality of profiles that express color characteristics of respective ones of the plurality of printers;

a client for outputting data to the plurality of printers and for being connected to the profile management server;

a color matching server for downloading profiles from the profile management server and performing color matching; and a network connecting the printers, the profile management server, the client and the color matching server;

the color matching server sending color-matched data to the printers;

wherein if a profile of a target printer that is the destination of the data output from the client is not under management, the profile management server decides a similar profile based upon information relating to the target printer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a diagram illustrating an example of a profile management table according to the first embodiment;

DESCRIPTION OF THE PREFERRED EMBODIMENTS

Preferred embodiments of the present invention will now be described in detail with reference to the drawings.

First Embodiment

System Configuration

Figure 1:
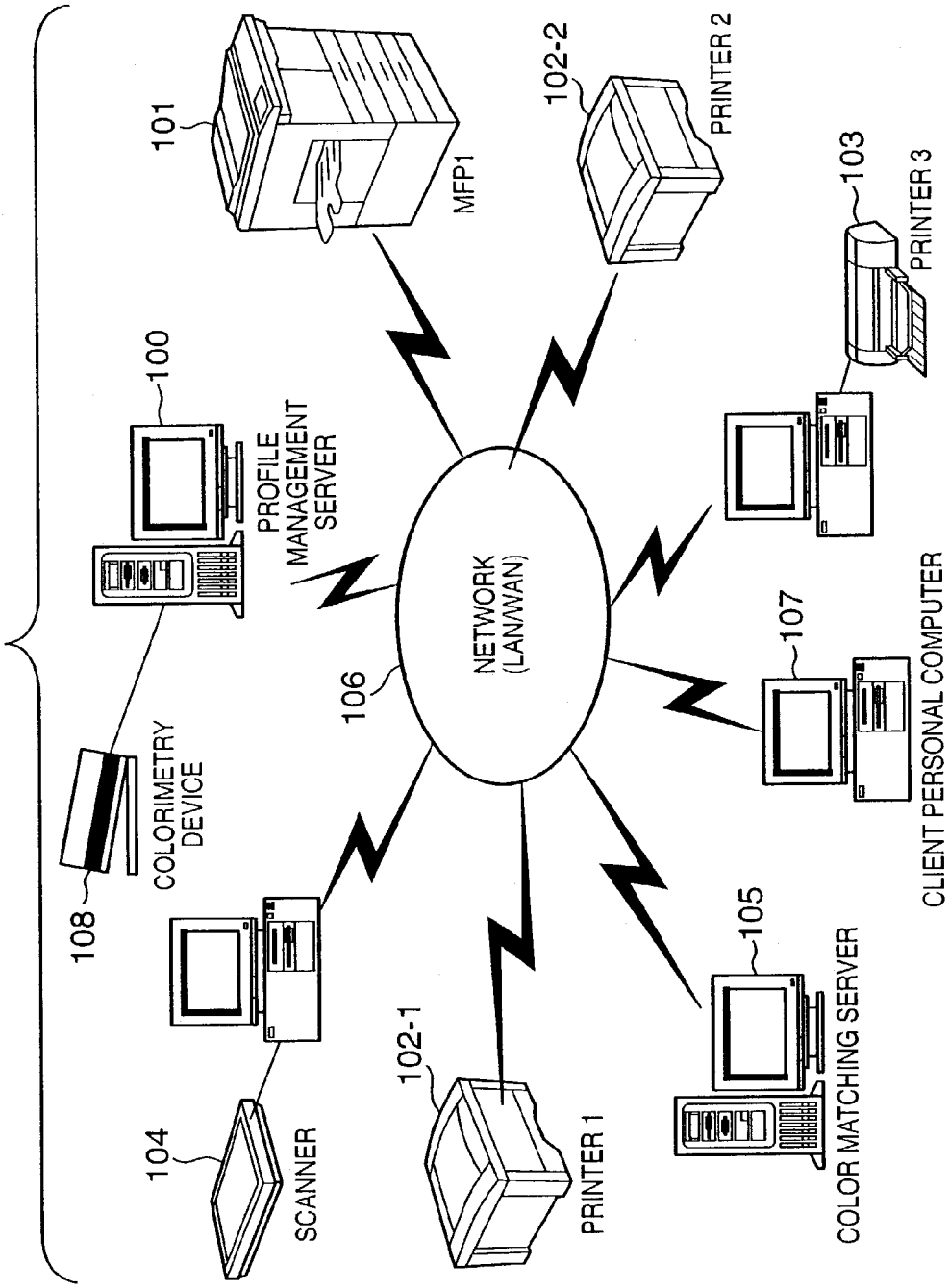
FIG. 1 is a diagram illustrating the configuration of a system according to a first embodiment of the present invention.

FIG. 1 illustrates an example of the configuration of a system according to a first embodiment of the present invention. The system includes a network 106 to which are connected a plurality of laser printers 102 of different models, an ink-jet printer 103 and a multifunction printer (MFP) 1. These printers are capable of printing in accordance with a request from a client personal computer (PC) 107. The user selects one of these multiple printers in accordance with the particular purpose and the printer responds by producing an output. For example, the criteria used in making the selection is whether the desired printer should provide an image quality suited to the printing of a natural image such as a photograph even though the printing speed will be slow, or whether the desired printer should be one that prints at high speed with an image quality satisfactory for the printing of document data.

A profile management server 100 retains and manages the ICC profiles of the multiple printers on the network 106 and of a target output device such as an externally registered printer. The profile management server 100 responds to requests for profile search and profile creation from a client 107 and to a request for profile download from the printers 101, 102, 103.

The profile management server 100 is provided internally with a profile creation module for creating a module for each printer on the network 106 automatically or in response to a command from the user. The details of the profile creation module will be described later. A profile that has been created by the program creation module is registered and managed in the profile management server 100 together with information indicating the model of the color printer/multifunction printer, serial number and creation date and time.

A colorimetry device 108 is connected to the profile management server 100. The colorimetry device 108 outputs measurement values of device-independent color space (Lab, XYZ, etc.) by measuring the colors of color patches formed on a printing medium. The colorimetry device 108 is used primarily when a profile is created in the profile creation module.

A color matching server 105 uses a source profile, which is an ICC profile of an output target device, and an output profile, which is a profile specific to a printer on the network 106, to perform color matching of image data delivered from the client personal computer 107, and sends the matched image data to a printer specified by the user.

The color matching server 105 is used primarily in a case where a color matching engine is not available on the side of the printers 102, 103 and multifunction printer 101. If the printer side has the ability to perform color matching, then it will suffice to use a color matching module on the printer side rather than the color matching server 105.

The client personal computer 107 outputs image data to any printer by way of an output application. Further, the client personal computer 107 has a profile management client, which is connected to the profile management server 100 and issues various requests and inquiries, as a software module.

Details of Profile Management Server

Figure 2:
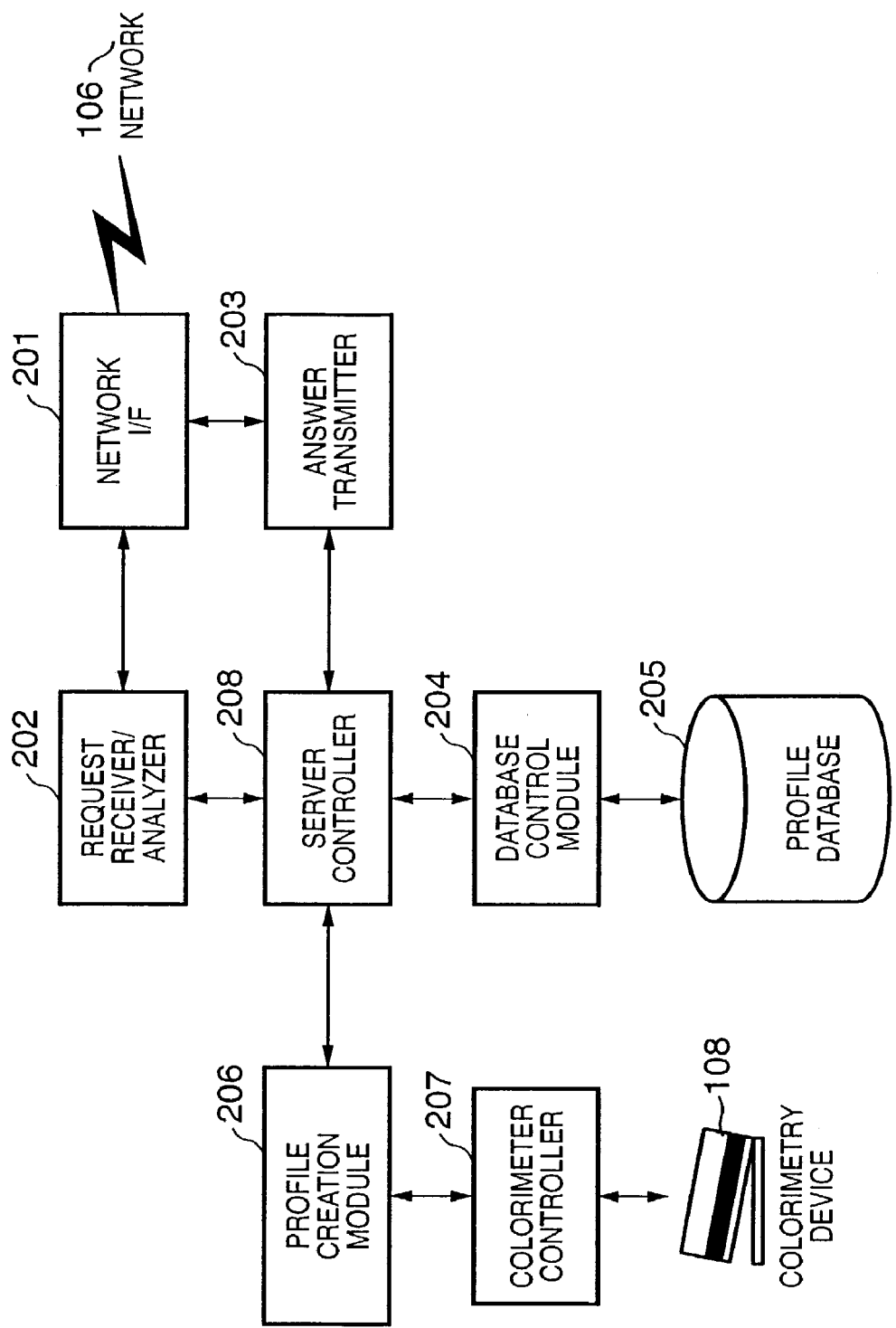
FIG. 2 is a block diagram illustrating an example of the structure of a profile management server according to the first embodiment.

The profile management server 100 will now be described in detail. The profile management server 100 (referred to simply as server 100 below) is implemented as software in a general-purpose computer. FIG. 2 illustrates the software modules of the server 100.

A network interface 201 in FIG. 2 is used to receive a request from the client personal computer 107 via the network 106 or to transmit the results of processing by the server 100 via the network 106. Data received from the client personal computer 107 has its content analyzed by a request receiver/analyzer 202. The transmission of processed results is performed by creating transmit data in an answer transmitter 203 and sending the data via the network interface 201. These operations are controlled by a server controller 208. It is assumed that a packet used in a request from the client personal computer 107 and in an answer to the client personal computer 107 comprises a command portion and a data portion.

A profile creation module 206 is driven by the server controller 208, acquires the result of color measurement of a predetermined patch image, which has been output from a printer, by the colorimetry device 108 via a colorimetry controller 207, and produces an ICC profile by calculating a color LUT, through a well-known method, based upon correspondence between signal values and colorimetric values when the patch image is formed.

The created profile is stored in a profile database 205 controlled by a database control module 204. The profile database 205 stores the profile and, at the same time, creates a profile management table of the kind shown in FIG. 3 and carries out profile management based upon this table. The management table according to this embodiment has the following items: printer product name 301, printer name 302, which is the name by which the printer is identified on the network, device category 303 primarily indicating which printing method is used by the printer, profile name 304 for indicating the substance of the profile in the database, and profile creation date 305, which indicates the date and time at which the profile was created.

Printer Operation

The internal operation of the printers 102, 103 in this embodiment will be described in simple terms with reference to FIG. 4. The printer receives image data by an image data receiving unit 402 via a network interface 401 and subjects the received image data to color matching processing using a color matching unit 403. An image data rasterizing unit 404 expands the color-matched image data into raster form, an image processor 405 submits the rasterized image data to image correction processing, etc., that is specific to the printer, and a printing unit 406 prints the processed image on printing paper.

The multifunction printer 101 further includes a scanner, but since the printing operation of the multifunction printer 101 is similar to that of the printers 102, 103, this need not be described.

Figure 4:
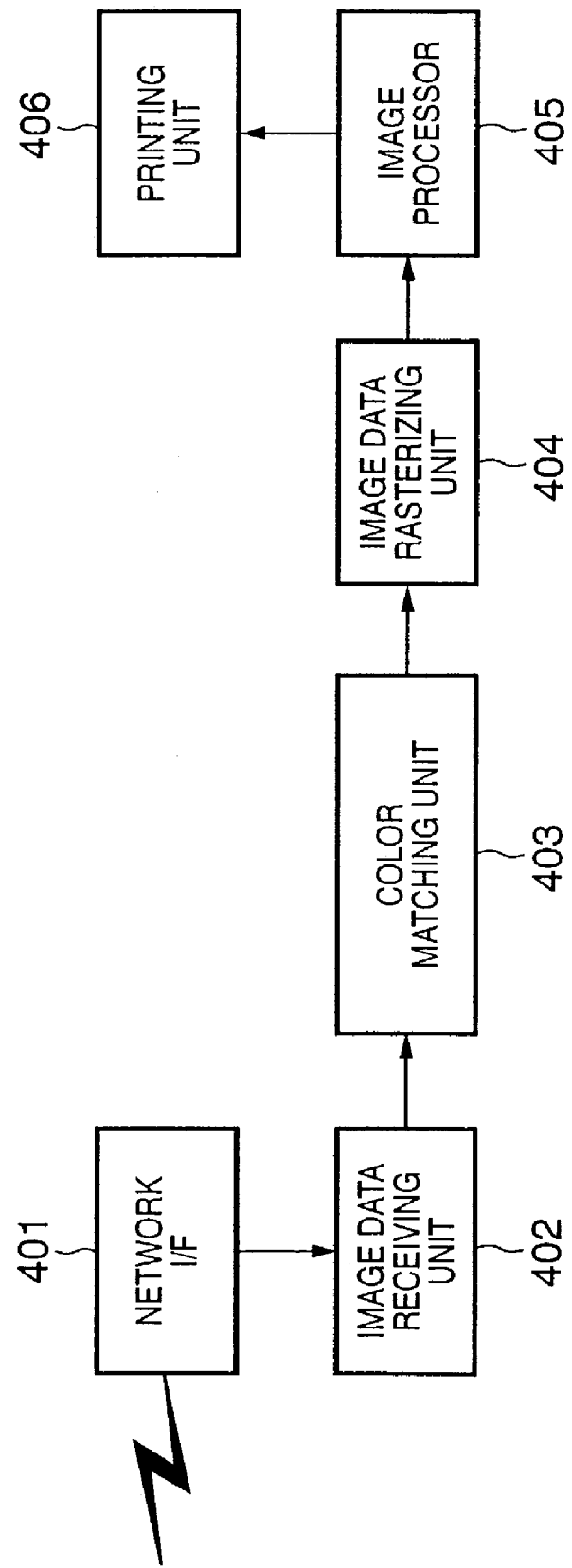
FIG. 4 is a block diagram illustrating an example of the structure of a printer according to the first embodiment.
Figure 5:
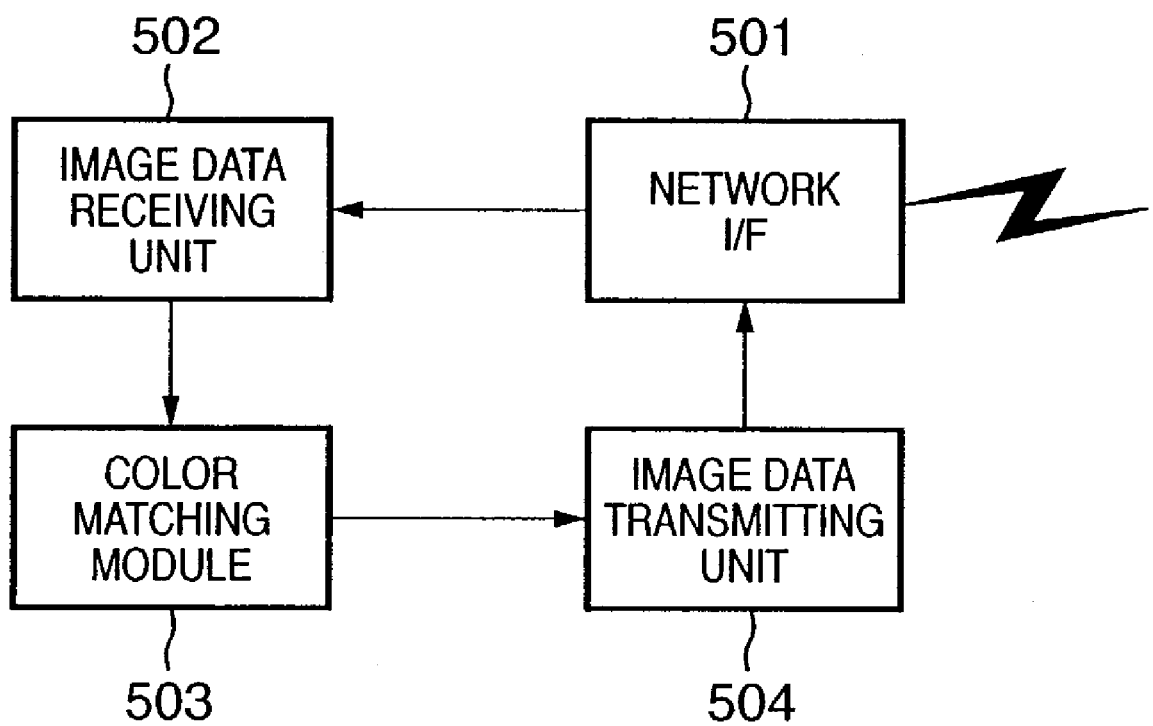
FIG. 5 is a block diagram illustrating an example of the structure of a color matching server according to the first embodiment.

Further, of the operations performed at the printers 102, 103 shown in FIG. 4, the color matching server 105 executes only the color matching function of the color matching unit 403. That is, as shown in FIG. 5, the color matching server 105 receives image data using an image data receiving unit 502 via a network interface 501 and subjects the received image data to color matching processing in a color matching module 503. The color-matched image data is transmitted from a transmitting unit 504 via the network interface 501.

Color Matching Processing (in a Case Where a Profile Exists)

Color matching processing for when image data output from the client personal computer 107 is output from any printer in the above-described image processing system according to this embodiment will now be described in detail.

Cases where the profile of an output device targeted for color matching (a printer for output purposes) is and is not present within the profile management server 100 will be considered in describing color matching processing in this embodiment.

Described first will be processing in a case where the source profile of the target output device is present within the profile management server 100.

Figure 6:
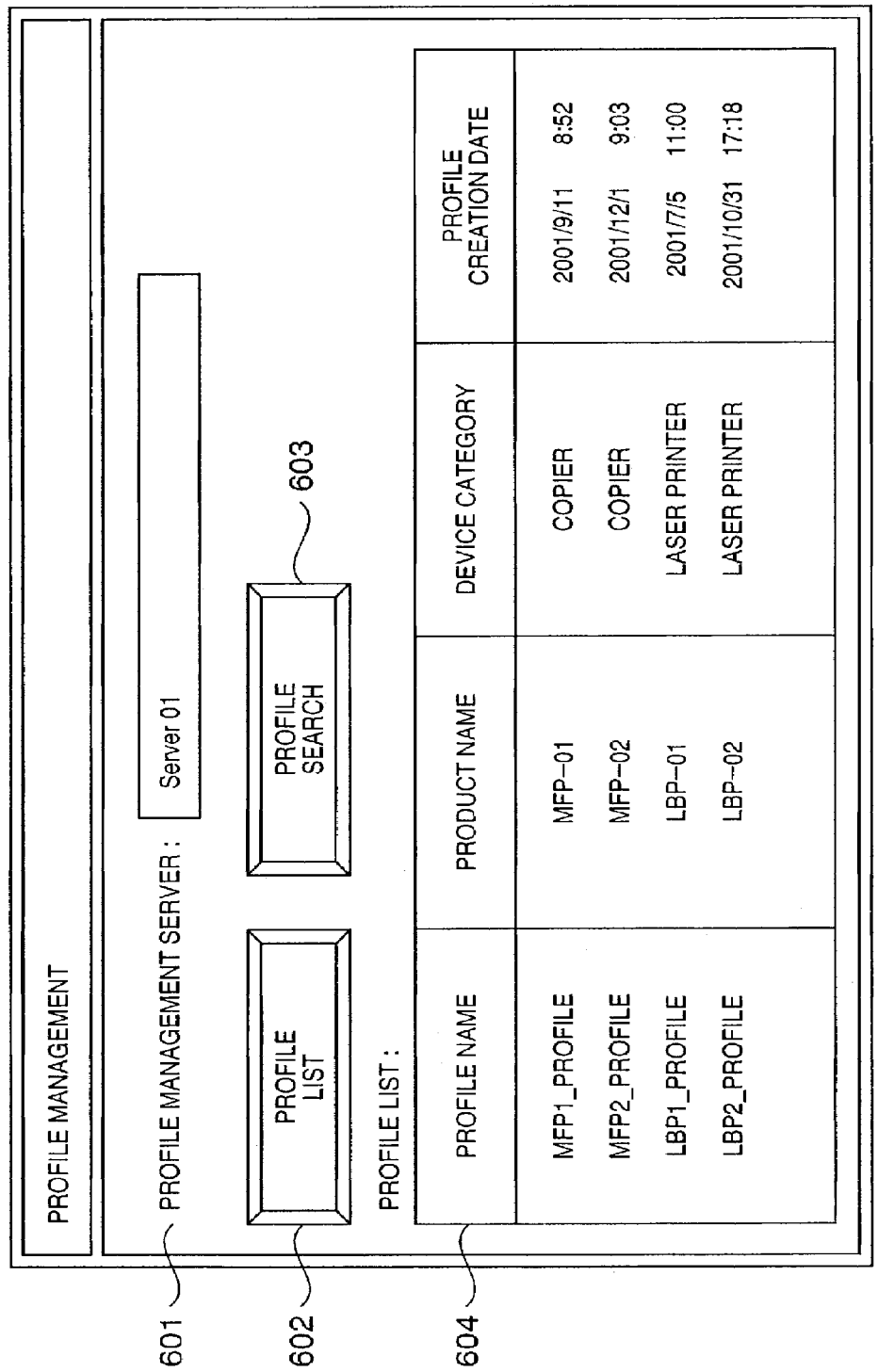
FIG. 6 illustrates an example of a GUI of a profile management client according to the first embodiment.

In this case, the client personal computer 107 uses a profile management client (the above-mentioned software module) having a GUI screen of the kind shown in FIG. 6 to determine whether the profile of interest exists in the profile management server 100. Specifically, in response to clicking of a "PROFILE LIST" button 602, the client personal computer 107 transmits a packet, in which a command indicating "PROFILE LIST REQUEST" has been set in the command portion thereof, to the profile management server (the profile management server 100 in this embodiment) indicated in area 601 in FIG. 6.

Image data from the client personal computer 107 is subsequently output to the printer of interest via an output application and printer driver.

Figure 7:
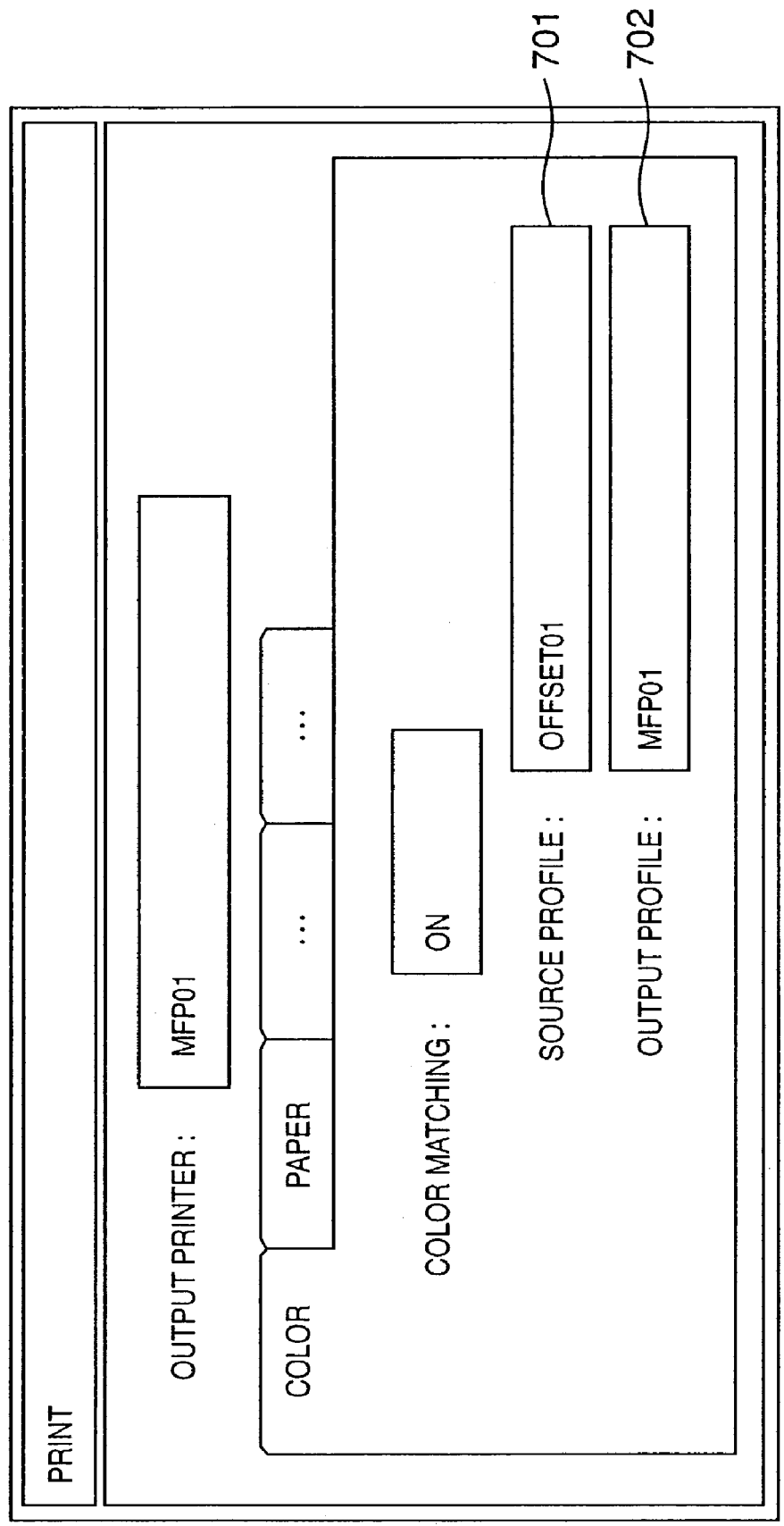
FIG. 7 illustrates an example of a GUI of a printer driver according the first embodiment.

If the printer per se has a color matching module, then color matching is caused to be executed by specifying a source profile 701 and an output profile 702 on a printer-driver setting GUI shown in FIG. 7.

If the printer per se does not have a color matching module, then color matching processing is executed by the color matching server 105. After color matching is performed by the color matching server 105, the resultant data is transmitted to the designated printer and print processing is executed. When data is transmitted to the color matching server 105, the source profile and output profile are specified using a GUI (not shown) for connecting to the color matching server and the printer that is to output the image data after color matching is specified.

When color matching processing thus starts based upon user commands entered via the GUIs, the printer or color matching server 105 sets the profile, which has been specified by the user, in the color matching module and executes a color matching operation.

At this time the printer or color matching server 105 issues a download request to the profile management server 100 and sets the downloaded profile if the printer or color matching server 105 does not internally incorporate the profile. If the printer or color matching server 105 has the profile, on the other hand, then, upon acquiring the time stamp of the profile, the printer or color matching server 105 queries the profile management server 100 as to whether this is the latest profile. If the latest profile is located in the server, then the printer or color matching server 105 downloads this profile at sets the same.

Creation of Approximate Profile (in a Case Where a Profile Does not Exist)

Described next will be color matching processing in a case where the profile management server 100 does not possess the source profile of the target output device. In this embodiment, it will be assumed that the printer which is the target output device is not at hand, as a result of which it is not possible to execute the usual profile creation procedure, namely the procedure for outputting an image patch, measuring the color thereof and then creating the profile.

This embodiment is characterized in that the profile management server 100 approximates the source profile of the target printer under the above circumstances. Processing for selecting an approximate profile in this embodiment will be described below.

Selection of Similar Profile Based Upon Ancillary Information

Figure 8:
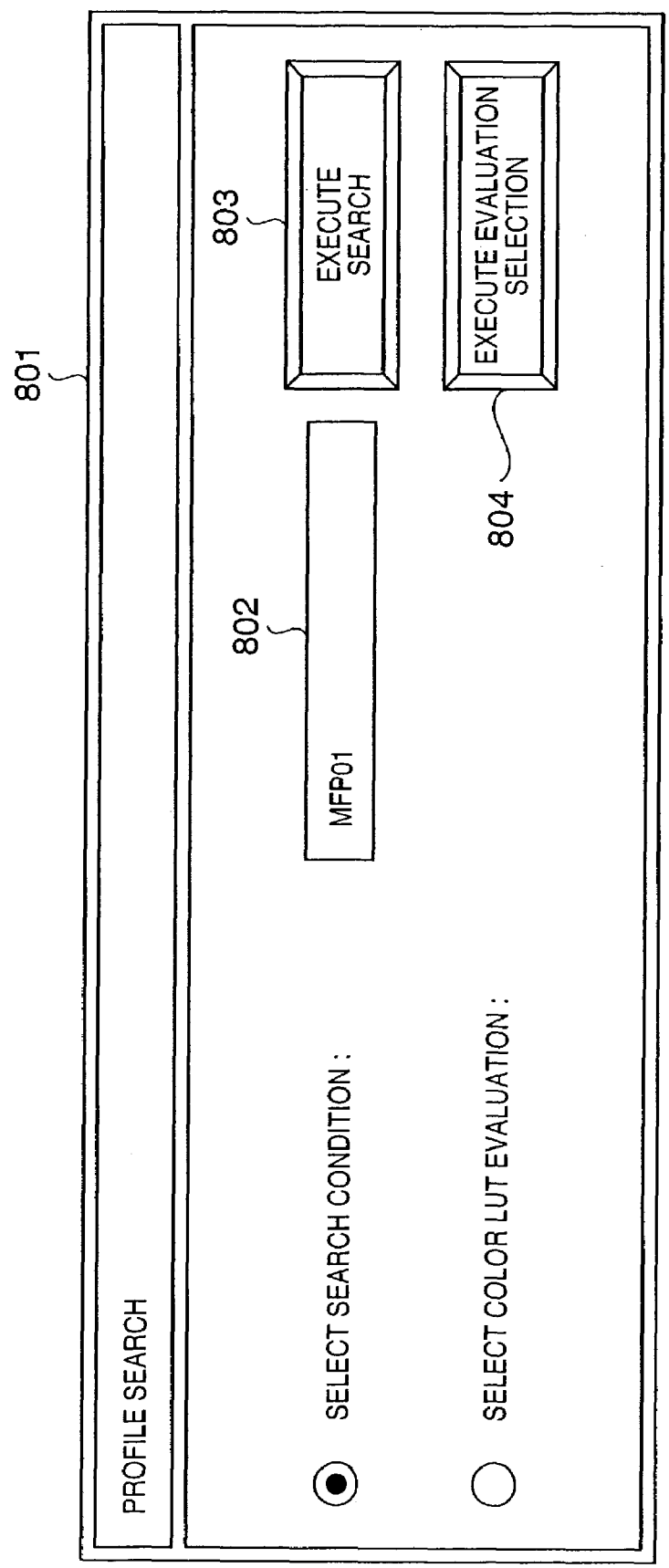
FIG. 8 illustrates an example of a GUI for a profile search according to the first embodiment.

If a "PROFILE SEARCH" button 603 on the GUI of FIG. 6 controlled by the profile management client is clicked at the client personal computer 107, a search condition GUI 801 of the kind shown in FIG. 8 is activated. By entering information relating to an unknown printer in a search-condition input area 802 and clicking a "EXECUTE SEARCH" button 803 on this GUI, the client personal computer 107 issues an inquiry command to the profile management server 100.

In response to the command, the, profile management server 100 extracts the entered information using the request receiver/analyzer 202 and instructs the database control module 204 to search for a profile that is in conformity with the extracted information. When this is done, the profile database 205 executes matching with respect to its own profile management table, extracts the profile name from the database and sends the profile name back to the profile management client in the client personal computer 107.

The printer product name and printer-scheme category (electrophotography, ink-jet, etc.) can be mentioned as examples of the information entered as the search key in the search-condition input area 802 shown in FIG. 8. With regard to the search of product name, a partial hit is acceptable. If the color reproducing scheme is approximately similar, as when product line-ups are similar, the model will be regarded as being "similar", even if the name is different, and the profile name of this similar model will be presented to the profile management client. One example of a method of determining whether a model is a similar model is to make the determination based upon a list of similar models that have been registered beforehand in the profile management server 100.

Thus, in the above embodiment, on the basis of ancillary information concerning a target printer, it is possible to select a profile specific to this printer or a profile having the most similar characteristics.

Selection of Approximate Profile Based Upon Color LUT Evaluation

Consider a case where the above-mentioned ancillary information concerning a printer cannot be utilized when selecting an approximate profile, or a case where the result of a color-matched output in accordance with a profile selected based upon ancillary information is unsatisfactory.

Assume that the target printer is an unknown printer that is not being managed by the profile management server 100 and is not at hand, and that only a print sample output from this printer and image data of this print sample exist. In such case it is not possible to execute the usual profile creation procedure, namely the procedure for outputting an image patch, measuring the color thereof and then creating the profile.

In this embodiment, it is assumed that a request for output of electronic data in a color made to conform to the print sample has been issued under the above circumstances, and the embodiment is characterized in that the profile management server 100 approximates the source profile of the unknown printer. That is, the profile management server 100 obtains the correspondence between colors reproduced by the print sample and electronic data, makes a comparison with the color LUT values in the profile table held by the profile management server 100, thereby measuring degree of similarity, and selects a similar profile.

Processing for selecting a similar profile based upon color LUT evaluation in a case where ancillary information cannot be utilized will now be described.

The profile management client within the client personal computer 107 sends the profile management server 100 the correspondence between colorimetric values and image data (pixel values) with regard to a plurality of points suitably sampled from the print sample.

Figure 9:
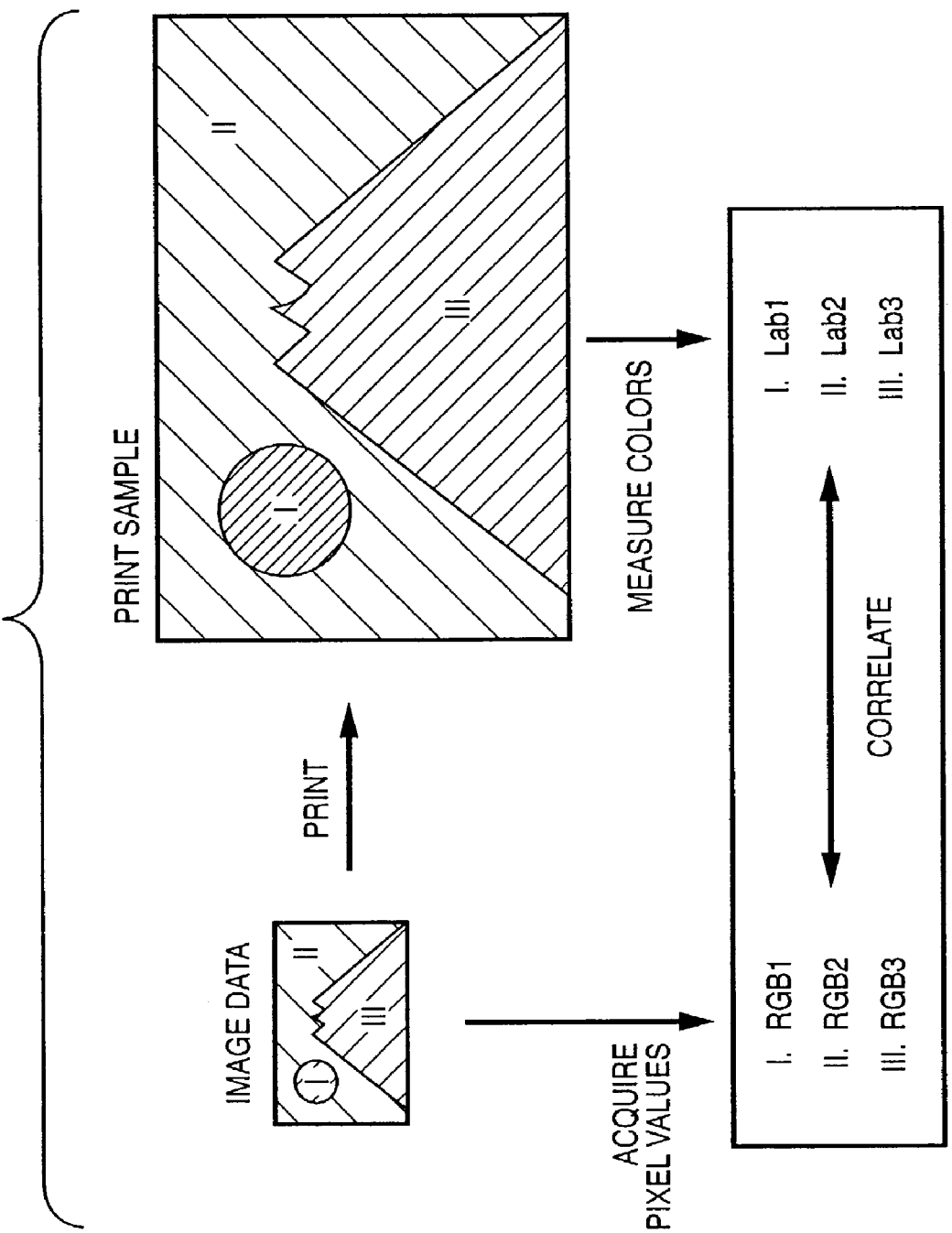
FIG. 9 is a diagram useful in describing a method of acquiring RGB-Lab correspondence according to the first embodiment.

Specifically, as shown in FIG. 9, if an area large enough to sufficiently cover a measurement window in a colorimetric unit (not shown) connected to the client personal computer 107 is present in the print sample, then, by measuring the colors in the print sample using the colorimetric unit, the client personal computer 107 will obtain the correspondence between the measured values and the image data (pixel values). In the example of FIG. 9, points I, II, III undergo color measurement and the pixel values (assumed here to be RGB values) corresponding to these points are picked up, whereupon three points of RGB-Lab correspondence are obtained. This correspondence data is transmitted to the profile management server 100.

In response, the profile management server 100 evaluates the color differences between this correspondence information and the color LUT of each existing profile and selects the approximate profile based upon the results of evaluation.

Figure 10:
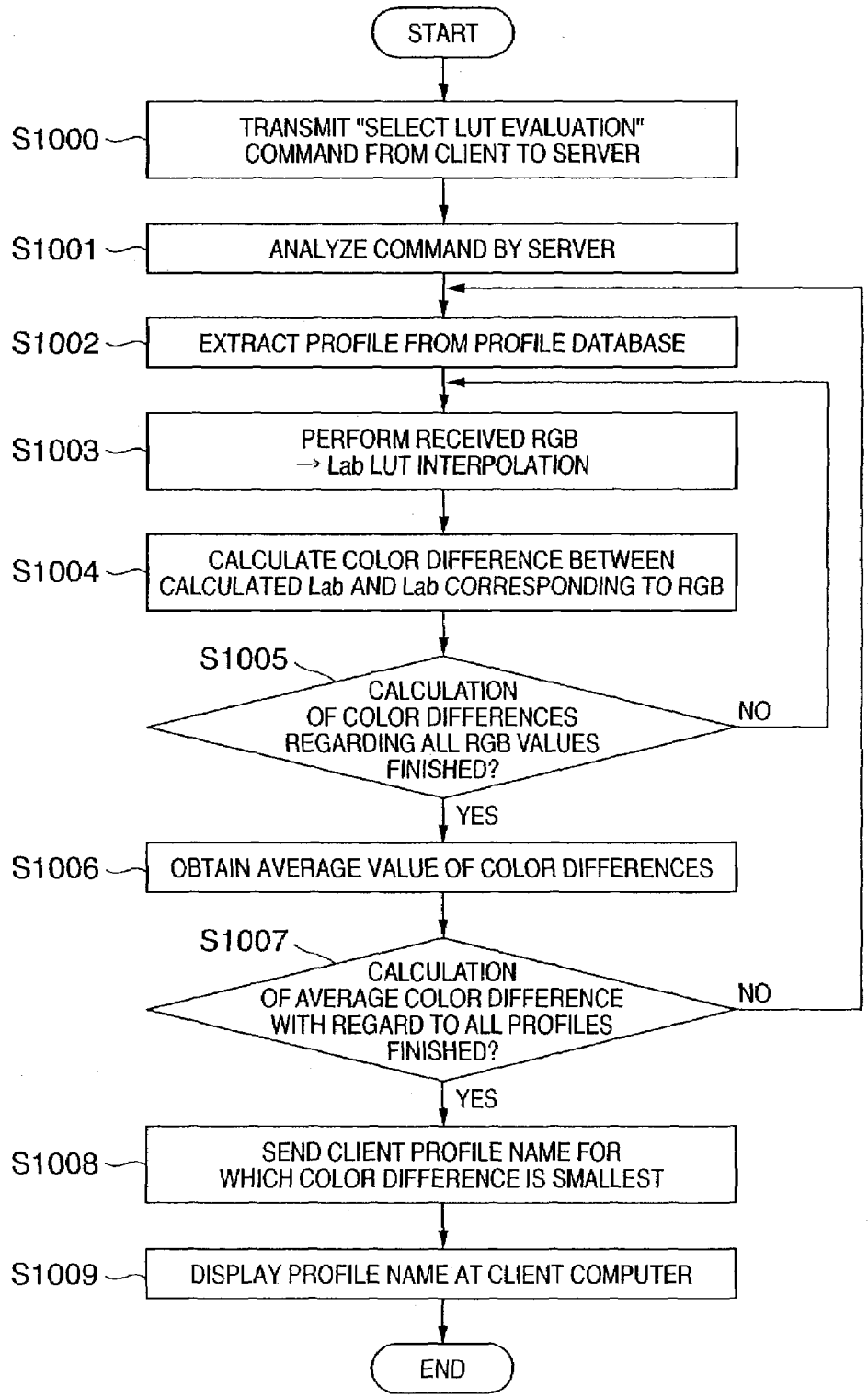
FIG. 10 is a flowchart illustrating profile selection processing based upon a color-difference evaluation according to the first embodiment.

Reference will now be had to the flowchart of FIG. 10 to describe processing for selecting an approximate profile by color LUT evaluation according to this embodiment. The processing of FIG. 10 for selecting the approximate profile is started by clicking a "SELECT LUT EVALUATION" button 804 on the GUI (FIG. 8) of the client personal computer 107, the LUT being controlled by the profile management client of the computer 107.

First, at step S1000 in FIG. 10, the profile management client in the client personal computer 107 sends the profile management server 100 a packet in which a command indicating "SELECT LUT EVALUATION" has been set in the command portion and "RGB1Lab1, RGB2Lab2, RGB3Lab3" has been set in the data portion. Next, at step S1001, the profile management server 100 receives and analyzes the packet and starts color LUT evaluation.

In color LUT evaluation processing executed by the profile management server 100, one profile is extracted from the profile database 205 at step S1002. If an RGB value is contained in the received data, the profile management server 100 extracts a profile that places the RGB value in device color space. This is followed by step S1003, at which the profile management server 100 uses the RGB-Lab color LUT of the ICC profile to obtain the Lab value corresponding to the received RGB value by a well-known LUT interpolation method. Next, at step S1004, the profile management server 100 obtains the error (color difference) between the Lab value found at step S1003 and the received Lab value. It is determined at step S1005 whether the color-difference calculations of steps S1003, S1004 have been completed with regard to all received RGB values (three in the example of FIG. 9). If the calculations have been completed for all received RGB values, the profile management server 100 obtains the average value of the color differences regarding all of the received RGB values at step S1006.

The profile management server 100 determines at step S1007 whether evaluation regarding all profiles has been executed, selects a profile for which the color-difference average is smallest at step S1008 and sends the name of this profile back to the client personal computer 107.

The client personal computer 107 displays the received profile name on a GUI (not shown) of selected results and then terminates processing at step S1009.

By downloading the thus selected profile to the unknown printer, optimum color reproduction becomes possible.

Thus, in accordance with this embodiment as described above, simple color matching can be performed with regard to an unknown printer for which the profile does not exist even in a situation in which only the print-out sample from this printer and the electronic data are available.

Second Embodiment

A second embodiment according to the present invention will now be described. The system configuration according to the second embodiment is similar to that of the first embodiment and need not be described again.

In the first embodiment, an example is described in which a single most similar profile is selected by evaluating an existing color LUT based upon the correspondence between reproduced colors of a print sample and image data. However, this evaluation method adopts average color difference as an evaluation item. In actuality, it is conceivable that a profile having a color LUT for which the smallest color error is obtained will differ from one RGB point to another in the print sample.

Accordingly, the second embodiment is characterized in that when a most similar profile differs from one point to another in the print sample, a single profile is synthesized from these multiple profiles.

Synthesizing Similar Profile by Color LUT Evaluation

In the second embodiment, the profile management server 100 synthesizes a similar profile based upon evaluation of a color LUT.

Figure 11:
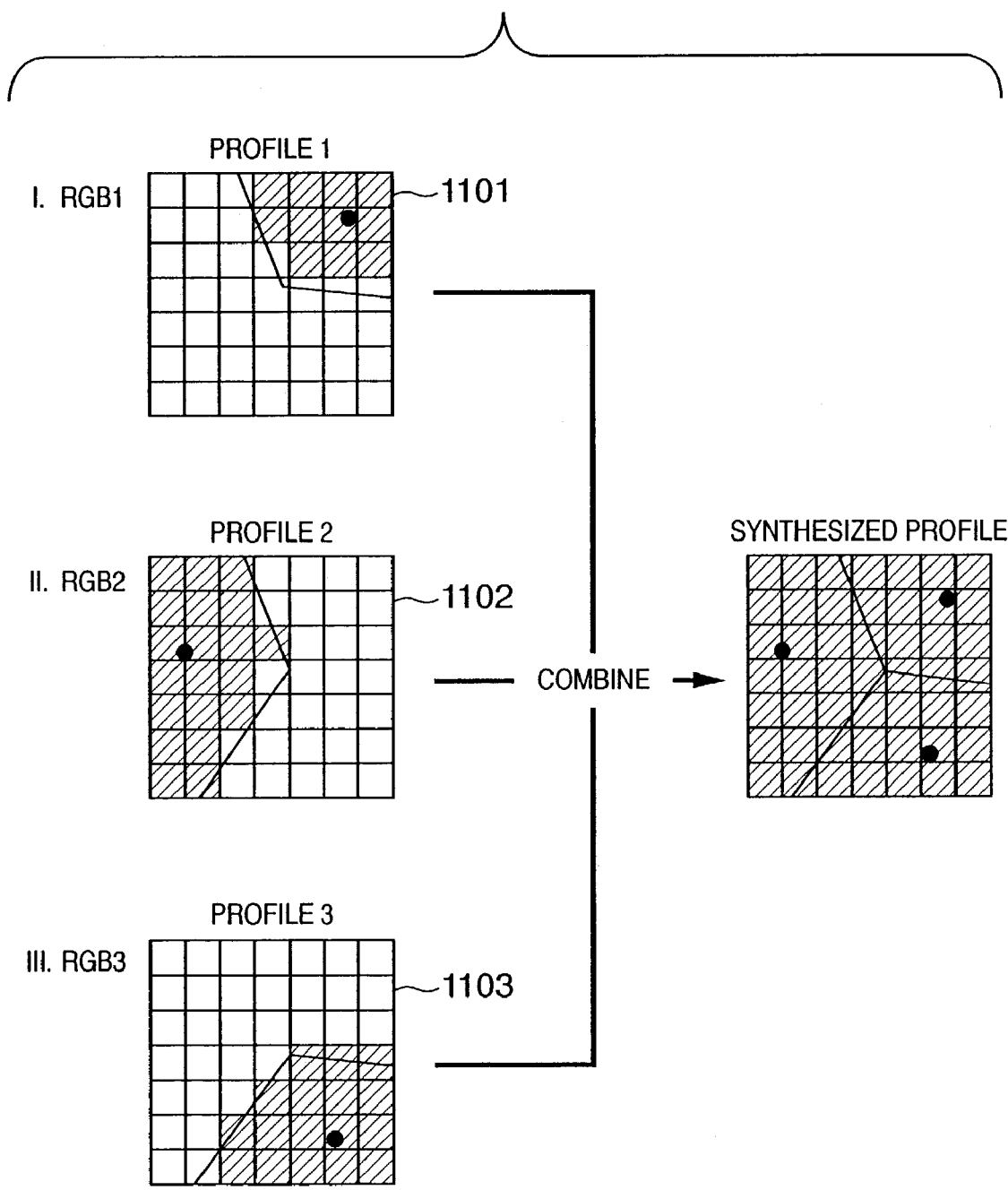
FIG. 11 is a diagram illustrating the concept of profile synthesis based upon a color-difference evaluation according to a second embodiment of the present invention.

FIG. 11 illustrates the concept of processing for synthesizing a similar profile according to the second embodiment. In FIG. 11, reference numerals 1101, 1102, 1103 denote RGB lattice spaces of profiles for which the color differences calculated at steps S1003, S1004 in FIG. 10 are minimized. These correspond to the RGB values which are the colorimetric values at the three points I, II, III, respectively, shown in FIG. 9 of the first embodiment. It should be noted that the lattice spaces shown in FIG. 11 are obtained by expressing an RGB lattice space, which is originally three-dimensional, in two dimensions.

The points marked by the black dots in each of the RGB lattice spaces indicate RGB points for which the color differences are smallest with regard to respective ones of the profiles. According to the second embodiment, a range of lattice points adopted as the color values of a combined profile are found about the black dots as center with regard to respective ones of the profiles.

A specific method of achieving this is to subject the three RGB points to Voronoi partitioning and adopt the partitioned areas as respective ones of spheres of influence. These areas are indicated by the hatching in FIG. 11. The combined profile is created by storing the Lab values corresponding to the RGB lattice points in respective ones of these hatched areas as a profile. In order to eliminate the discontinuity at boundaries of the hatched areas, smoothing should be performed at the boundaries.

The profile management server 100 communicates with the client personal computer 107 so as to set the name of the combined profile created at as described above. The combined profile is registered anew in the profile database 205 of the profile management server 100 by the profile name sent back from the client personal computer 107.

The profile synthesized in the second embodiment only assures matching with respect to a specific color at the point of measurement in the print sample. If the number of points on the print sample of FIG. 9 is increased, therefore, i.e., if the corresponding relationships between obtained colorimetric values obtained and signal values increase, the number of colors for which optimum color matching can be achieved will increase.

Thus, in accordance with the second embodiment as described above, it is so arranged that even if an approximate profile differs for every point on the print sample, it is possible to synthesize a single profile that reflects all of these profiles. As a result, it is possible to carry out color matching that better reflects the reproduced colors of a print sample.

Thus, in accordance with the present invention as described above, simple color matching can be applied to a printer for which it is difficult to create a unique profile.

The present invention is not limited to the above embodiments and various changes and modifications can be made within the spirit and scope of the present invention. Therefore, to apprise the public of the scope of the present invention, the following claims are made.

What is claimed is:

1. An image processing system comprising:
    a plurality of printers;
    a profile management server for managing a plurality of profiles that express color characteristics of respective ones of said plurality of printers;
    a client for outputting data to any one of said plurality of printers and for being connected to said profile management server; and
    a network connecting said printers, said profile management server and said client,
    wherein said printers download profiles from said profile management server and perform color matching, and
    wherein if a profile of a target printer that is the destination of the data output from said client is not under management, said profile management server creates a similar profile by evaluating color differences with respect to color values of profiles under management on the basis of colorimetric values on a print sample printed by the target printer and image data values of the print sample and combining a plurality of profiles selected based upon results of the evaluation.

2. An image processing system comprising:
    a plurality of printers;
    a profile management server for managing a plurality of profiles that express color characteristics of respective ones of said plurality of printers;
    a client for outputting data to any one of said plurality of printers and for being connected to said profile management server;
    a color matching server for downloading profiles from said profile management server and performing color matching; and
    a network connecting said printers, said profile management server, said client and said color matching server,
    wherein said color matching server sends color-matched data to said printers, and
    wherein if a profile of a target printer that is the destination of the data output from said client is not under management, said profile management server creates a similar profile by evaluating color differences with respect to color values of profiles under management on the basis of the colorimetric values on a print sample printed by the target printer and image data values of the print sample and combining a plurality of profiles selected based upon results of the evaluation.

3. The system according to claim 1, wherein said profile management server selects a profile for which the color difference is smallest for every colorimetric value on the print sample.

4. A method of controlling an image processing system in which a plurality of printers, a profile management server for managing a plurality of profiles that express color characteristics of respective ones of the plurality of printers, and a client for outputting data to any one of the plurality of printers and for being connected to the profile management server are connected by a network, said method comprising the steps of:
    the printers downloading profiles from the profile management server and performing color matching; and
    if a profile of a target printer that is the destination of the data output from the client is not under management, the profile management server creating a similar profile by evaluating color differences with respect to color values of profiles under management on the basis of colorimetric values on a print sample printed by the target printer and image data values of the print sample and combining a plurality of profiles selected based upon results of the evaluation.

5. A computer-readable recording medium storing, in executable form, a program executed by a computer for causing said computer to operate as the profile management server set forth in claim 1.

6. The system according to claim 1, wherein said profile management server further performs a smoothing of the boundaries of the plurality of profiles upon the combination of the plurality of profiles.

7. An image processing method for managing a plurality of profiles that express color characteristics of respective ones of a plurality of printers, the method comprising the steps of:
    if a profile of a target printer that is one of the plurality of printers is not under management, evaluating color differences with respect to color values of profiles under management on the basis of colorimetric values on a print sample printed by the target printer and image data values of the print sample; and
    combining a plurality of profiles selected based upon results of the evaluation, to create a similar profile for the target printer.

* * * * *